United States Patent [19]
Stark et al.

[11] Patent Number: 5,284,016
[45] Date of Patent: Feb. 8, 1994

[54] EXHAUST GAS BURNER REACTOR

[75] Inventors: Terrance L. Stark, Washington, Mich.; Joel L. Toof, Carmel, Ind.; Frank Ament, Troy, Mich.

[73] Assignee: General Motors Corporation, Detroit, Mich.

[21] Appl. No.: 936,468

[22] Filed: Aug. 28, 1992

[51] Int. Cl.$^5$ .............................................. F01N 3/02
[52] U.S. Cl. ....................................... 60/303; 431/353
[58] Field of Search ............... 60/303, 261; 431/353, 431/350

[56] References Cited

U.S. PATENT DOCUMENTS

| | | | |
|---|---|---|---|
| 3,218,134 | 11/1965 | Walsh | 60/303 |
| 3,736,752 | 6/1973 | Melchoir | 60/303 |
| 4,381,643 | 5/1983 | Stark | 60/303 |
| 4,383,411 | 5/1983 | Riddel | 60/303 |
| 4,481,767 | 11/1984 | Stark | 60/303 |
| 4,502,278 | 3/1985 | Stark | 60/303 |
| 4,677,823 | 7/1987 | Hardy | 60/274 |
| 4,744,217 | 5/1988 | Goerlich et al. | 60/303 |
| 4,840,028 | 6/1989 | Kusada et al. | 60/303 |
| 4,944,153 | 7/1990 | Goerlich et al. | 60/303 |
| 4,987,738 | 1/1991 | Lopez-Crevillen et al. | 60/286 |
| 4,991,396 | 2/1991 | Goerlich et al. | 60/303 |
| 5,038,562 | 8/1991 | Goerlich | 60/303 |
| 5,063,737 | 11/1991 | Lopez-Crevillen et al. | 60/286 |
| 5,105,621 | 4/1992 | Simmons et al. | 60/303 |
| 5,203,690 | 4/1993 | Maruko | 451/353 |

Primary Examiner—Tony M. Argenbright
Assistant Examiner—M. Macy
Attorney, Agent, or Firm—Karl F. Barr, Jr.

[57] ABSTRACT

An exhaust gas burner reactor which comprises a burner apparatus having a combustor tube which extends axially in a spaced relationship to an exhaust gas conduit. The combustor tube has a first, base end having fuel and air inlets and a mixing chamber therein, and a second combustor end having a combustor chamber and outlets for ejecting burning fuel and air into the exhaust gas conduit. The combustor assembly is oriented so as to locate the burner outlets upstream of the first end so that heated exhaust gas/burner output mixture passes through an exhaust reactor defined between the combustor tube and the exhaust gas conduit. The reactor aids in the combustion of unreacted fuel components in the exhaust gas.

7 Claims, 5 Drawing Sheets

EXHAUST GAS BURNER REACTOR

BACKGROUND OF THE INVENTION

1. Field of the Invention

This invention relates to an internal combustion engine exhaust treatment apparatus and, in particular, to a fuel fired burner for heating an exhaust stream.

2. Description of the Relevant Art

Advancement in emission technologies for internal combustion engines has resulted in significantly lowered total engine emissions. In general, automotive emissions applications employ an exhaust mounted catalytic treatment device for reduction of regulated exhaust constituents such as Hydrocarbons (HC), Carbon Monoxide (CO), and Oxides of Nitrogen ($NO_x$) in the engine exhaust prior to its release to the atmosphere.

The catalytic treatment devices, or catalytic converters, rely on the heat of the exhaust gas to become catalytically active following a cold start. Initiation of catalytic activity occurs at the light-off temperature and is typically in the area of 400 degrees C. A substantial amount of time, on the order of 75-100 seconds or more, may be required before the engine exhaust supplies sufficient heat to the converter for the catalyst to light off. This delay in light-off of the catalyst occurs at a time when the engine is typically calibrated to run in a rich, open loop control format to insure rapid and smooth engine start-up and good vehicle performance immediately after start. Rich vehicle calibration leads to a high fuel/air ratio resulting in additional tailpipe emissions following start-up and prior to converter light-off.

In order to reduce cold-start engine emissions, it is desirable to provide an additional heat source at, or before, engine start-up to supplement exhaust heat and promote faster heating of the converter with a reduced time to optimal catalyst efficiency. In addition, it is desirable to minimize engine-out emissions prior to converter light-off by adding heat to the engine exhaust soon after its exit from the engine so as to promote the reaction of exhaust constituents such as Hydrocarbon (HC) and Carbon Monoxide (CO).

Several technologies have been considered for the preheating of catalytic converters. Electrically heated converters, which use an engine driven electrical system to heat elements in the converter, or the catalyst support itself in the case of metal supports, have been proposed. The heat output of the electrically heated units is directly related to the electrical input. In order to achieve the desired, rapid heating of the catalyst support, significant power must be supplied by the electrical system. In addition, electrically heating the catalyst support does not promote the reaction of exhaust constituents within the exhaust system upstream of the converter during the time prior to light-off when a reduction in engine-out emissions is desirable.

Burner systems, to which the present invention is directed, have also been considered for achieving rapid catalyst heating. Although not suffering from the drawbacks of electrically heated units, such systems require a burner, a fuel system, and an ignition system, along with the related complexity and packaging problems of such systems. In addition, rapid, reliable ignition of the burner, burner control, and adequate mixing of burner output with the engine exhaust have been problematic. Typically, burner based systems have not been useful for reacting the exhaust constituents within the exhaust system upstream of the converter for reducing engine-out emissions prior to catalyst light-off.

SUMMARY OF THE INVENTION

Accordingly, an object of the present invention is to provide a simplified burner design, which is capable of integration into the vehicle fuel and powertrain systems, thereby reducing cost and complexity and increasing reliability.

Another object of the present invention is to provide a burner having a unique combustor configuration installable in the engine exhaust conduit, upstream of the catalytic converter, and operable to react exhaust constituents therein, prior to catalyst light-off, while rapidly heating the converter.

The burner comprises a combustor assembly having a means for mixing fuel and air, and a source for ignition of the fuel/air mixture. The combustor assembly is disposed within a reactor canister which is mounted in close proximity to the engine exhaust ports. In a preferred embodiment, the reactor canister is a modified exhaust conduit such as the engine exhaust manifold or the takedown pipe which extends between the exhaust manifold and the underbody exhaust system in the case of many vehicular applications.

The mounting configuration of the combustor assembly within the reactor canister is such that the burner outlets are located at the upstream end thereof. The upstream outlet location benefits overall emission performance by adding heat to the exhaust gas stream at a location which is close to the engine outlets to promote the reaction of emission constituents upstream of the catalytic converter. Following mixing with the burner output, the exhaust gas flows over the hot exterior of the combustor assembly as it moves downstream through the reactor canister. The result is the establishment of an exhaust reactor, upstream of the catalytic converter, defined between the combustor and the exhaust conduit, which reacts a significant portion of the early engine-out emissions typically found in the exhaust gas stream of an internal combustion engine operating in an open-loop control mode following cold start. The reaction of the exhaust constituents helps to reduce engine emissions at a time when the catalytic converter is not operating at optimal conversion efficiency, while aiding in the rapid light-off of the converter by adding heat to the exhaust gas stream.

An additional benefit to the reactor/burner of the present invention is the ability to utilize standard vehicle converter and exhaust configurations since the burner combustor is located upstream of the converter.

Other objects and features of the invention will become apparent by reference to the following description and to the drawings.

DESCRIPTION OF THE PREFERRED EMBODIMENTS

Figure 1:
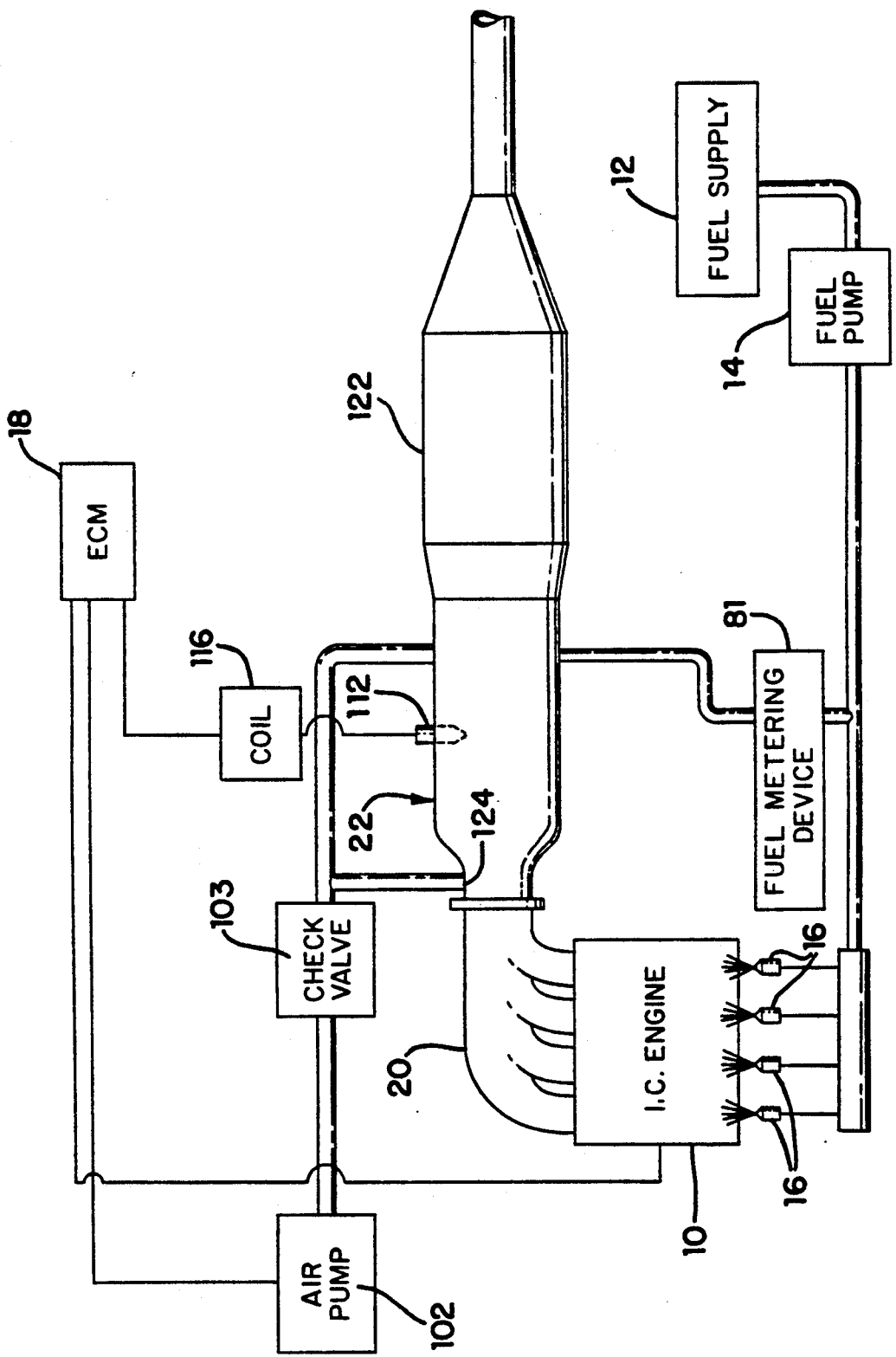
FIG. 1 is a schematic view of an internal combustion engine, and related components, embodying the present invention.

FIG. 1 schematically illustrates a typical application of the exhaust burner/reactor of the present invention to the exhaust system of an internal combustion engine. The engine 10 is supplied with fuel from a fuel system comprising a fuel tank 12 and fuel pump 14 which deliver pressurized fuel to fuel distributing means, such as injectors 16. An electronic control module 18 monitors engine parameters and varies fuel and ignition accordingly. Exhaust exiting engine 10 is collected by an exhaust manifold 20 which channels the flow into reactor canister-takedown pipe 22.

Figure 2:
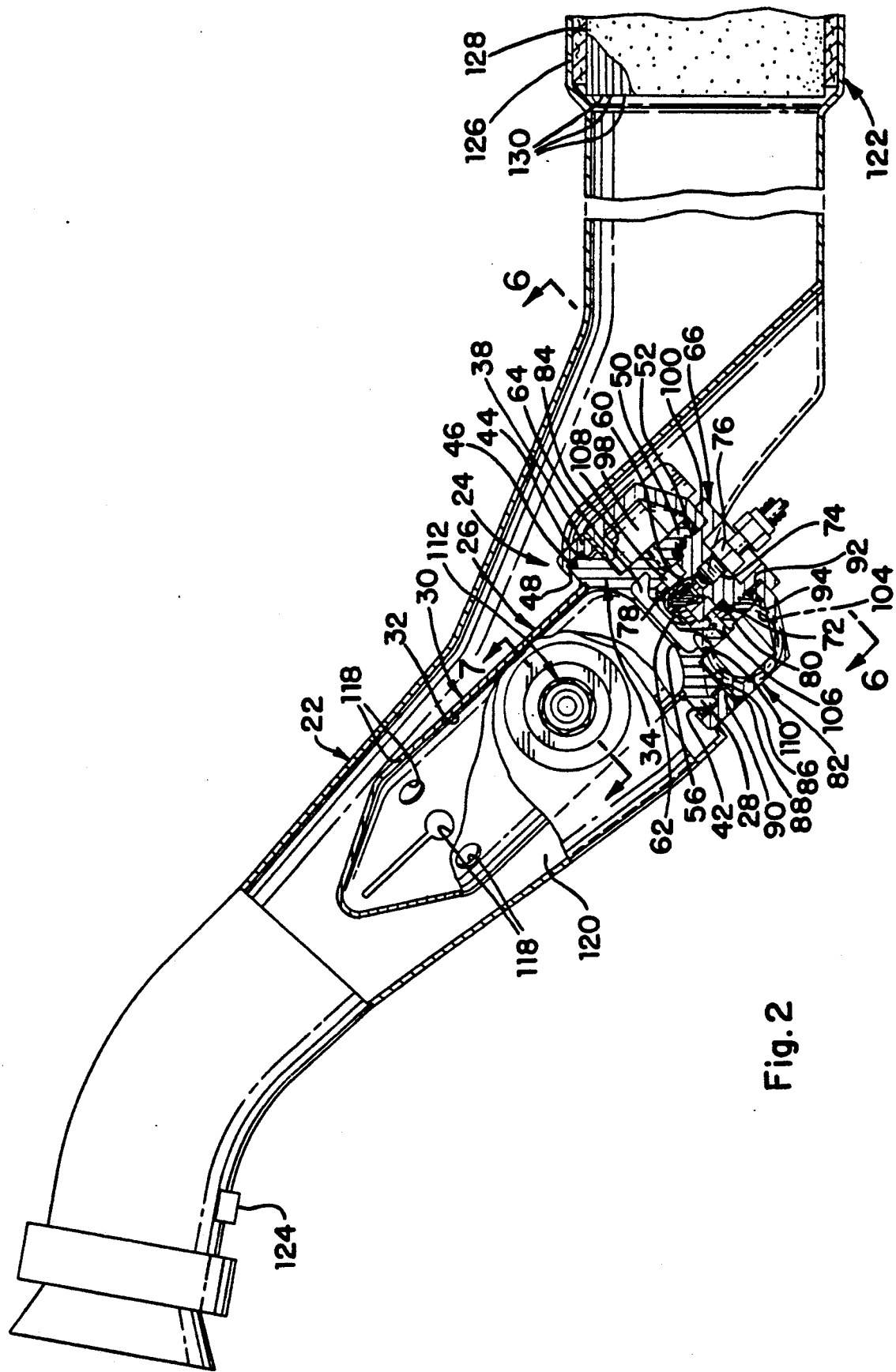
FIG. 2 is a side view of the exhaust gas burner reactor of the present invention.
Figure 3:
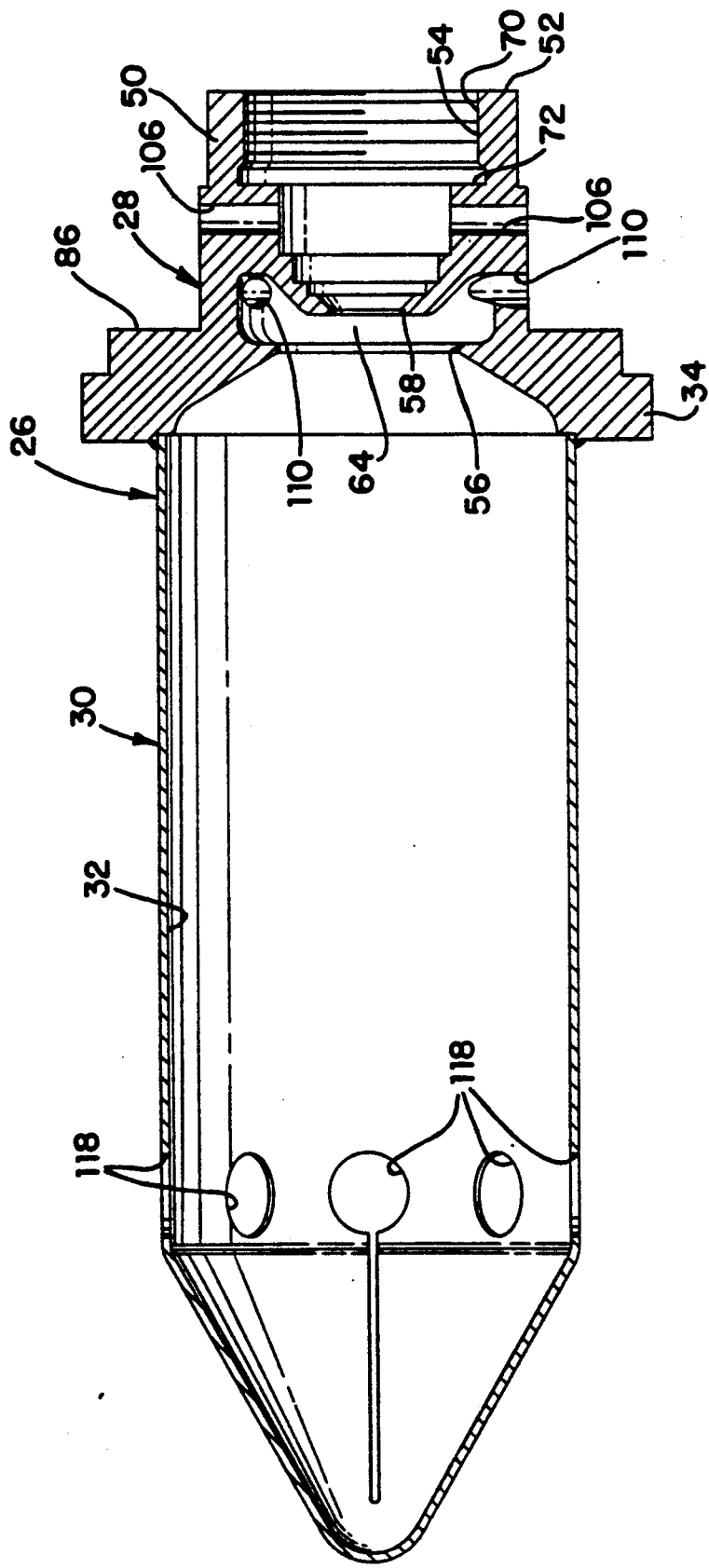
FIG. 3 is a side view of the tubular combustor which is a component of the exhaust gas burner reactor of the present invention.
Figure 4:
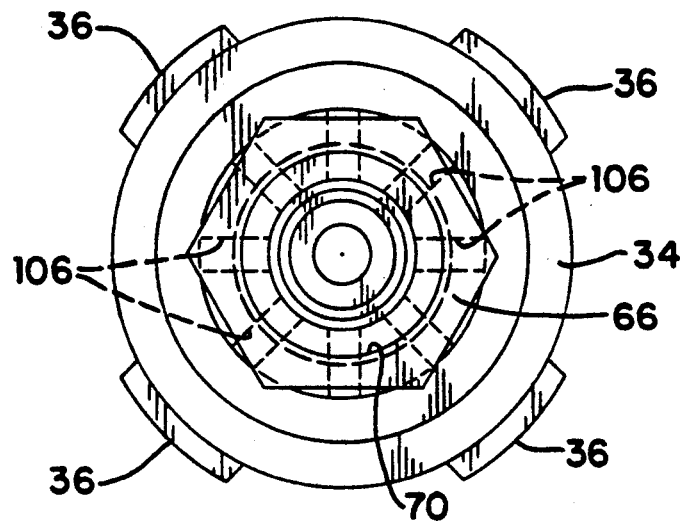
FIG. 4 is a partial end view of the base end of the tubular combustor of the present invention.
Figure 5:
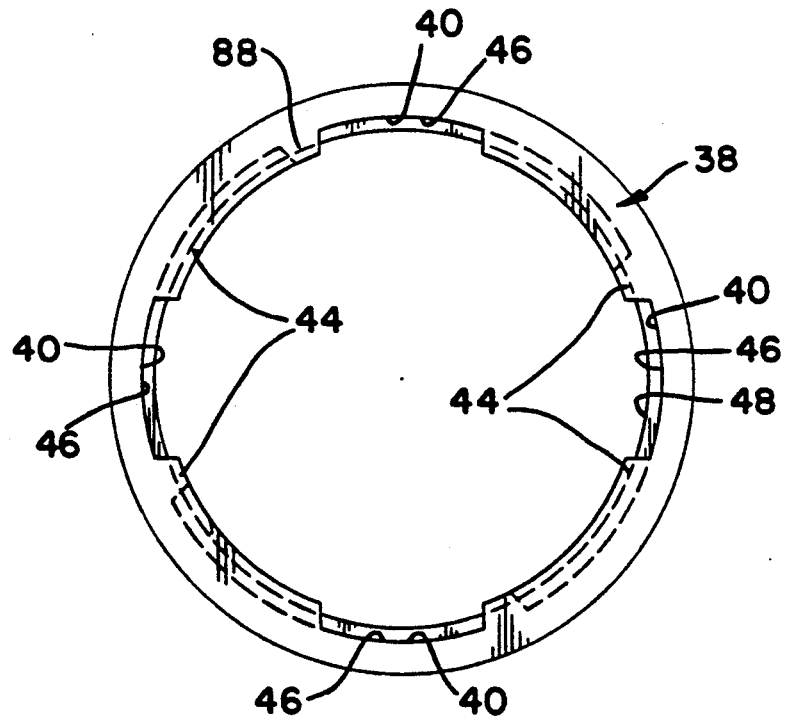
FIG. 5 is a view showing details of the combustor mounting flange of the exhaust gas burner reactor of the present invention.

Referring to FIGS. 2 and 3, a burner assembly 24 is disposed in reactor canister-takedown pipe 22. The burner assembly 24 comprises a combustor 26 having a base 28 and an axially extending, tubular combustor 30 housing a combustor chamber 32 therein. The base portion 28 provides several functions, as will be described. A locking ring or flange 34 extends about the outer perimeter of base portion 28 and, as illustrated in FIG. 4, has a series of locking tabs 36 situated in a circumferentially spaced configuration thereabout. The locking flange 34 of base 28 cooperates with mounting flange 38, see FIG. 5, of reactor canister-takedown pipe 22 to support the combustor 26 therein. Tabs 36 of locking flange 34 engage corresponding recesses 40 formed in the mounting flange 38 and, once engaged therein, the combustor assembly rides within channel 42 defined by upper retaining flanges 44, side wall 46 and lower retaining flange 48. The combustor is rotated within channel 42 to move and engage the tabs 36 under upper retaining flanges 44 thereby locking the combustor 26 in place relative to the reactor canister-takedown pipe 22.

Combustor assembly base 28 includes side walls 50 terminating in upper surface 52 and having a stepped inner wall 54 comprising a through-bore in base 28, which extends into combustor chamber 32, defining opening 56 at the base of combustor chamber 32. Referring to FIG. 3, an angled annular flow director 58 is disposed about the inner perimeter of stepped inner wall 54. The flow director 58 is configured to closely receive the end portion of fuel supply nozzle 60, see FIG. 2, such that the injection portion 62 of the nozzle 60, the annular flow director 58, and the inner wall 54 cooperate to define a fuel/air mixing chamber 64 adjacent opening 56 to combustion chamber 32.

The fuel nozzle 60 may comprise any of a number of designs which are well known in the art. For example, a fuel filming nozzle, which utilizes fuel system pressure for fuel vaporization, is preferred for its robust design, which allows reliable burner operation under a wide range of fuel and air flows. The fuel nozzle 60 is located within base 28 by a nozzle head 66 having a threaded outer portion which cooperates with a corresponding threaded inner portion 70 of inner wall 54. The inner wall is threaded from the upper surface 52 to shoulder 72. When installed in base 28, nozzle head 66 receives fuel fitting 74, which may be held in place by connector 76 and operably connects the nozzle 60 to fuel supply 12. In addition, provision may be made within the nozzle head 66 to receive fuel filter 78. Disposed between shoulder 72 and nozzle head 66 is a sealing member 80 to provide a fluid seal therebetween. It should be noted that shoulder 72 is effective as a stop, to limit the force which may be exerted on fuel nozzle 60.

Fuel meter 81 regulates fuel from supply 12 to a desired pressure and flow rate which is consistent with the goals of the burner control strategy, as determined by controller 18. The fuel meter 81 may be a pulse width modulated injector or electronic fuel regulator capable of continually modulating fuel supply relative to a predetermined input percent duty cycle. Alternately, metering device 81 may comprise a separate fuel pump (not shown) in cases where burner fuel may not be supplied from the engine fuel system.

Figure 6:
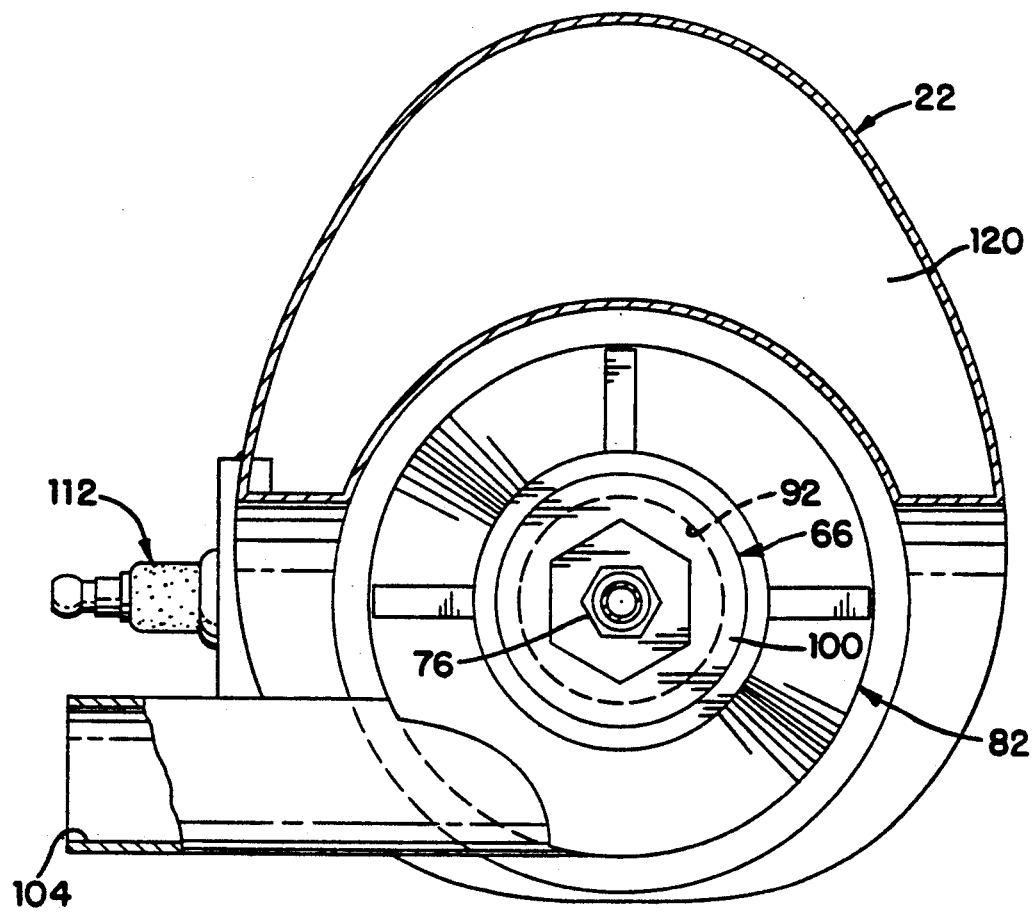
FIG. 6 is a sectional view of the exhaust gas burner reactor of FIG. 3 taken along line 6—6 of FIG. 3.

Fuel atomizing and primary combustion air are required to be supplied to the nozzle and, in the preferred embodiment, this is achieved through air distribution housing 82, illustrated in FIGS. 2 and 6.

Air distribution housing 82 has a sealing flange 84 which engages sealing surfaces 86 and 88 of locking flange 34 of combustor base portion 28, and mounting flange 38 of reactor canister-takedown pipe 22, respectively. A sealing member, such as gasket 90, may be disposed between the sealing flange 84 and sealing surfaces 86 and 88 to provide an air-tight seal therebetween. An opening 92 is defined in air distribution housing 82 for the passage of the fuel nozzle 60 and fuel fitting 74 into combustor base 28. The opening has an inner perimeter sealing surface 94 which sealingly engages upper surface 52 of side walls 50. A sealing member 56 may be disposed between the inner perimeter sealing surface 94 and upper surface 52 to establish an air-tight seal therebetween. Once in place, the air distribution housing 82 defines air distribution chamber 98 therein. Retention of the air distribution housing is through annular flange 100 extending about the outer perimeter of nozzle head 66. As the nozzle head is threaded into combustor base 28, it effectively draws the base, reactor canister-takedown pipe 22, and air distribution housing 82 together.

Air is supplied to air distribution housing 82 via an air source 102 such as an engine driven air pump, a high performance electric blower, or other suitable source of pressurized air, as shown in FIG. 1, which may be regulated to a predetermined pressure. A check valve 103 disposed in the air supply line, intermediate of the housing 82 and air pump 102, prevents leakage of exhaust from burner assembly 24 to the air pump during periods of inoperation. Air is supplied from the air source 102 through inlet duct 104 to distribution chamber 98 where a portion enters atomizer air passages 106. The atomizer air passages lead to atomizer air manifold 108 situated between nozzle head 66 and fuel nozzle 60. From this location, air is directed to nozzle portion 62 where it is mixed with fuel. The fuel/air mixture is guided by angled annular flow director 58 into fuel/air mixing chamber 64 (see FIG. 3), where primary combustion air is introduced and further atomization occurs. The primary combustion air enters fuel/air mixing chamber 64 from air distribution chamber 98 through a series of air inlets 110, which are configured to induce a vortex in the fuel/air mixture to enhance mixing.

Figure 7:
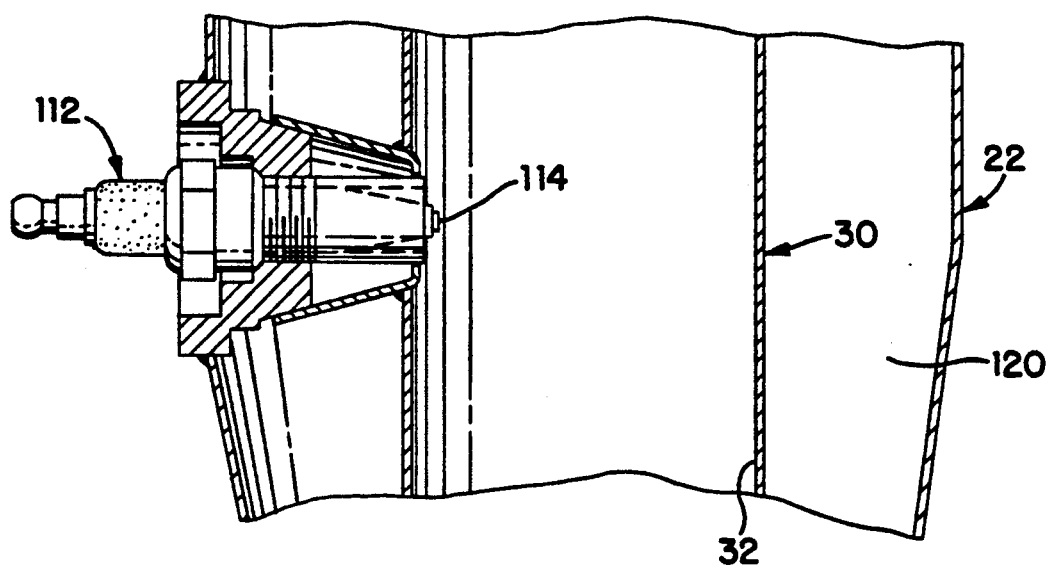
FIG. 7 is a partial bottom view of the exhaust gas burner reactor of FIG. 3 showing the ignitor installation.

The atomized fuel/air mixture departs fuel/air mixing chamber 64 through opening 56 at the base of combustor chamber 32 and is subsequently subject to ignition by an ignitor 112. The ignitor 112 is operatively mounted to the burner assembly 24, see FIG. 7, such that the tip 114 of the ignitor 112 protrudes into the combustion chamber 32 for igniting the entering fuel-/air mixture. The ignitor 112 may be of any suitable type as, for example, a spark plug or a glow plug. The ignitor 112 is connected to a coil 116 or other suitable means for energization, which in turn is operated by controller 18. In order to properly control fuel and air supplied to the burner following combustor ignition, a sensor may be utilized to signal the controller when a flame is present within the combustor chamber 32. The flame sensor may be integrated within the ignitor 112, as described in related application U.S. Ser. No. 07/902249, filed Jun. 22, 1992, or it may be a separate sensor located within the combustor.

The burning fuel/air mixture travels in an axial direction through the combustor to outlets 118 situated at the end of the tubular combustor 30. Due to the mounting position of the burner assembly 24 in the reactor canister-takedown pipe 22, the direction of movement of the burning fuel/air mixture within the combustor 30 is in a direction which is opposite that of the exhaust gas flow through the takedown pipe 22. Such a mounting configuration allows the combustor outlets 118 to be placed as far upstream in the reactor canister-takedown pipe 22 as practical. Exhaust from the burner outlets 118 is in a substantially radial direction relative to the axis of the tubular combustor 30 and the exhaust gas flowing through the reactor canister-takedown pipe 22 so as to assure optimal mixing of the burner output with the engine exhaust gas flow.

In addition, the coaxial and reverse mounting of the burner assembly 24 within the reactor canister-takedown pipe 22 has the effect of moving the outlets 118 of the combustor 30 further upstream in the exhaust system so as to increase the amount of time available for the burner output to heat and react with the engine exhaust. In addition, the burner assembly 24, and more specifically the combustor tube 30, defines, with the reactor canister-takedown pipe 22, an exhaust system reactor 120 which extends substantially from the outlets 118 of the combustor 30 to the face of catalytic converter 122. In the exhaust system reactor 120, the rich engine exhaust gas is mixed with air and heated by the output from combustor 26. The combination of heat, oxygen rich air, and increased residence time in the exhaust reactor under those conditions aids in the reaction of unburned fuel constituents exiting the engine at a time when the fuel system may be running in an open loop, rich mode immediately after cold start. At the same time, the heat from the burner reactor aids the catalytic converter 122 in reaching the elevated temperature at which the catalyst may operate at maximum efficiency.

Excess air, which is required for reaction of the excess fuel components in the engine exhaust and for the complete combustion of the burner fuel, is preferably added to the exhaust stream at a location in the exhaust system upstream of the burner outlets 118, such as excess air inlet port 124. Excess air is preferably supplied by air pump 102, in a manner illustrated schematically in FIG. 1. Although excess air may be added at other locations, such as in the combustor 26, addition of the excess air as far upstream as possible will promote optimal mixing with the exhaust gas and may enhance emissions reduction by initiating reaction of exhaust components earlier.

Downstream of the reactor canister-takedown pipe 22 is a catalytic converter 122. The converter 122 may be positioned at any location downstream of the assembly; however, maximum heating efficiency will be realized when the converter is close to the burner assembly as indicated in the Figures. The converter is provided with a housing 126 having a catalyst support 128 situated therein. The housing 126 may be constructed as a one-piece tubular member having inlet and outlet end portions or may be a multipiece clamshell-type unit with integral inlet and outlet end pieces. The catalyst and associated support may be of any suitable material and construction for use in an internal combustion engine exhaust environment for the conversion of exhaust constituents in the exhaust gas. Suitable catalyst support materials may include, for example, monolithic ceramic structures or metal foil structures. In the embodiment shown, support 128 is a monolithic ceramic structure having a honeycomb configuration so as to define axially extending channels 130 through which exhaust gas passes. A catalyst coating on the channel walls reacts with particular exhaust constituents as the gas passes therethrough. To minimize the effects of differing coefficients of thermal expansion between the catalyst support and the canister, a flexible support material 132 may be disposed therebetween. The material will vary, dependent upon the particular catalyst support utilized, and may also be extended into the end cone areas to provide thermal insulation when desirable.

The exhaust gas burner reactor of the present invention provides a solution to higher engine emissions typically found following a cold start of an internal combustion engine and prior to the light-off of the exhaust treatment, catalytic converter.

The present invention discloses a burner/reactor having a unique burner configuration which emphasizes simplicity of construction for ease of assembly through the use of an interlocking flange arrangement which is secured through the use of a threaded fuel nozzle head.

In addition, the disclosed invention places the burner in an orientation which allows burner output to be ejected upstream of the combustor. The burner output enters the engine exhaust gas stream in a direction which is substantially perpendicular to the flow for optimal mixing. Following mixing of the exhaust gas flow with the burner output, the heated gas moves through an exhaust gas reactor which is defined between the burner combustor and the reactor canister-takedown pipe to react unburned fuel components present in the exhaust gas.

The embodiment of the present invention described above discloses the placement of the burner in a modified exhaust takedown pipe allowing substantially unmodified exhaust manifold and catalytic converters to be used. It is contemplated, however, to install the burner in the exhaust manifold, particularly in v-configured engines where the exhaust from both engine banks converges at a common junction. Such placement has the benefit of closer placement of burner output to the engine exhaust ports and establishment of the exhaust reactor further upstream providing increased reaction time of the exhaust gas prior to entering the converter.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows:

1. An exhaust treatment apparatus comprising a burner assembly having a first, fuel/air mixing chamber and a second, primary combustion chamber, said chambers in communication therewith, said fuel/air mixing chamber having means for the introduction of fuel and air thereto, said air supply means comprising a series of air inlets positioned about said fuel/air mixing chamber, said primary combustion chamber comprising an elongated tubular member having a first end in communication with said fuel/air mixing chamber, ignition means operable to ignite fuel and air entering said chamber from said fuel/air mixing chamber, and a second end having outlets for the burning fuel/air mixture, said burner assembly mounted within an exhaust gas conduit such that said primary combustion chamber extends in a substantially coaxial relationship to said conduit with said outlets located upstream from said burner assembly relative to the flow of exhaust gas through said conduit, said burner assembly and said exhaust gas conduit defining an exhaust gas reactor downstream of said outlets, wherein burner output exiting said combustor through said outlets heats exhaust gas flowing through said conduit and said exhaust gas reactor combusts excess fuel in the exhaust gas flowing therethrough.

2. A burner for heating an exhaust gas stream, as defined in claim 1, said retaining means threadably attachable to said combustor assembly wherein said housing flange and said end housing is captured between said combustor flange and said retaining means.

3. A burner for heating an exhaust gas stream, as defined in claim 1, said end housing and said sealing surface defining an air distribution chamber therebetween for supplying atomizing and combustion air to said combustor through openings in said first end of said elongated combustor.

4. An exhaust treatment apparatus comprising a burner apparatus having an axially elongated combustor tube with first and second ends, said first end integral with a base portion, said base portion having a mounting flange extending thereabout, and said second end having an opening therein and comprising an outlet, said exhaust treatment apparatus further comprising an exhaust gas conduit having an inlet and outlet and a burner mounting opening located intermediate of said inlet and said outlet, said burner mounting opening having a mounting flange extending thereabout and configured to cooperate with said burner mounting flange to locate said combustor within said exhaust gas conduit in a substantially coaxial relationship therewith and with said opening in said second outlet end of said combustor tube located upstream of said first end relative to the flow of exhaust gas through said conduit, said combustor tube and said exhaust gas conduit defining an exhaust gas reactor therebetween, wherein burner output exiting said combustor through said opening heats exhaust gas flowing through said exhaust gas reactor and said exhaust gas reactor combusts excess fuel in the exhaust gas.

5. A burner for heating an exhaust gas stream, as defined in claim 4, said retaining means comprising a nozzle head operable to mount a fuel nozzle in an operable relationship with said first end of said elongated combustor and having means for connection to a source of fuel for supplying said nozzle therewith.

6. An exhaust treatment apparatus comprising a burner apparatus having an axially elongated combustor tube with first and second ends, said second end having an opening therein and comprising an outlet end, said exhaust treatment apparatus further comprising an exhaust gas conduit having an inlet and outlet and a burner mounting opening located intermediate of said inlet and said outlet, said burner mounting opening cooperating with said combustor tube to locate said combustor tube within said exhaust gas conduit in a substantially coaxial relationship therewith and with said opening in said second, outlet end of said combustor tube located upstream of said first end relative to the flow of exhaust gas through said conduit, said combustor tube and said exhaust gas conduit defining an exhaust gas reactor therebetween, wherein burner output exiting said combustor through said opening heats exhaust gas flowing into said exhaust gas reactor and said exhaust gas reactor combusts excess fuel in said exhaust gas.

7. A burner for heating an exhaust gas stream comprising an elongated combustor assembly having a flanged member disposed about the perimeter of a first end, a housing comprising an elongated member and having an opening formed therein, said opening having a flanged member disposed thereabout and configured to cooperate with said flanged member of said elongated combustor to support said combustor within said housing, said mounting flanges defining a sealing surface, and an end housing having a flanged member disposed about the perimeter thereof and configured to sealingly engage said sealing surface, said end housing having an opening therein for passage of fuel and air to said combustor, and retaining means operable to fix said elongated combustor assembly, said housing assembly and said end housing together.

* * * * *